United States Patent Office 2,976,685
Patented Mar. 28, 1961

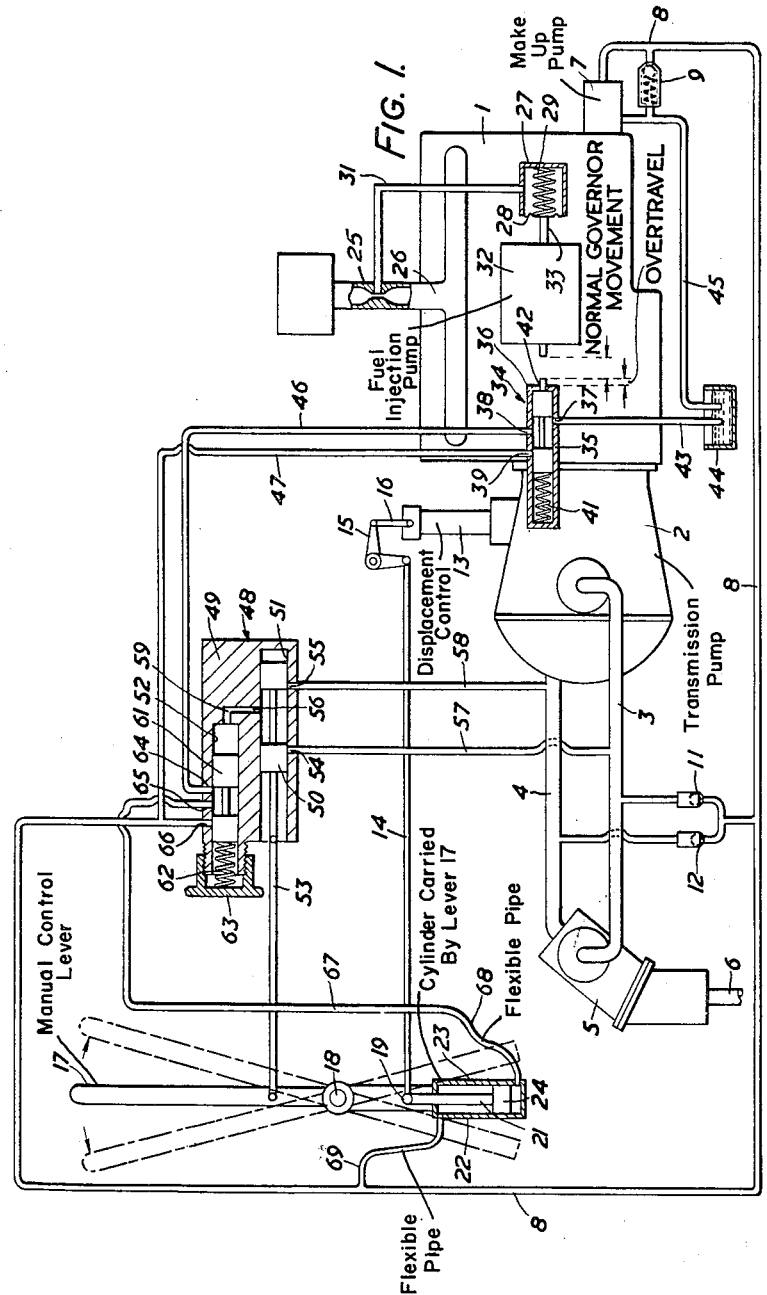

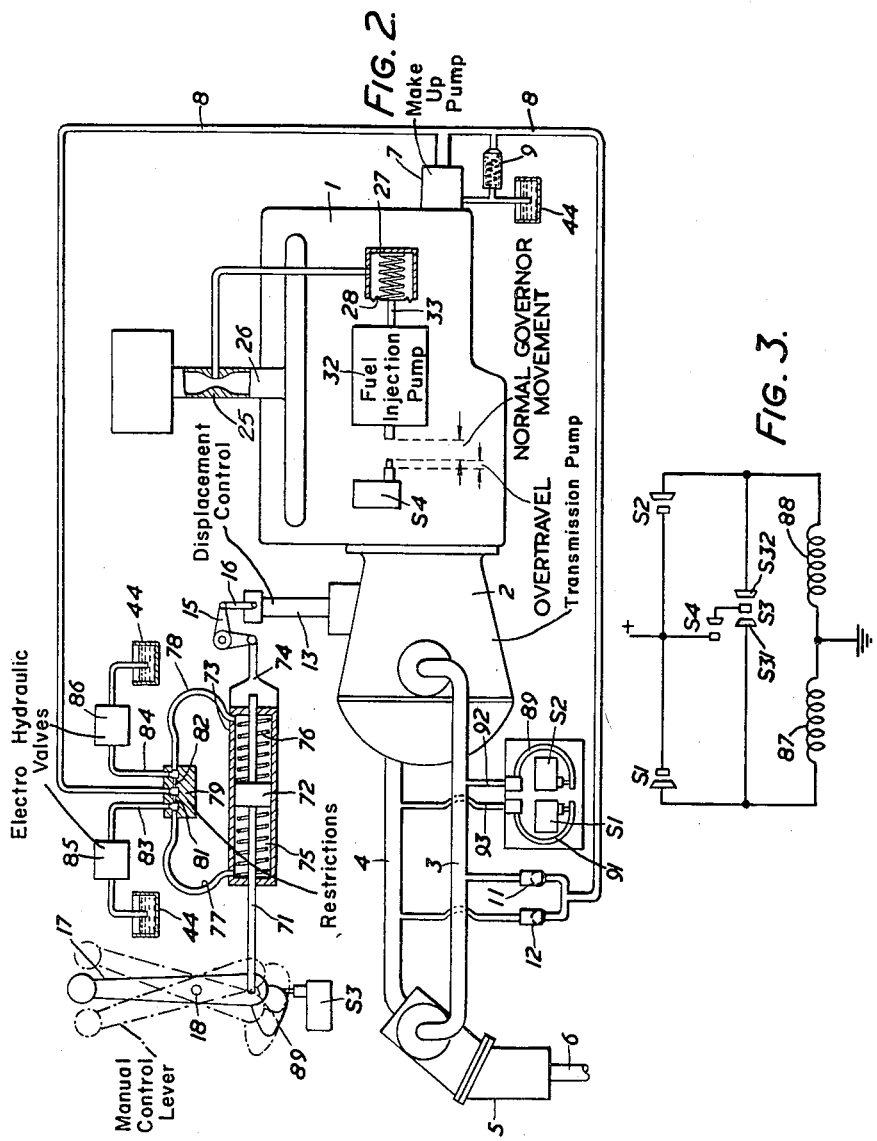

2,976,685

VARIABLE HYDRAULIC POWER TRANSMISSIONS

Oswald Thoma, Grunwald uber Munich, Germany, and Donovan Arthur Follows, Charlton Kings, Cheltenham, and Bertram Carl Kempson, St. Marks, Cheltenham, England, assignors to Dowty Hydraulic Units Limited, Tewkesbury, England Filed Nov. 30, 1959, Ser. No. 856,037

Claims priority, application Great Britain Dec. 2, 1958

14 Claims. (Cl. 60—53)

This invention relates to variable hydraulic power transmissions for transmitting mechanical power between a power source such as an engine, and a load, and of the kind comprising a variable positive displacement pump driven by the power source and a positive displacement motor fed with hydraulic output from the pump and connected to drive the load. Such a transmission is particularly intended for use on vehicles to transmit power from the engine to the driving wheels or other ground engaging elements.

The main object of the present invention is to provide a variable hydraulic transmission of the kind referred to acting between a power source and load, in which pump displacement may be adjusted at will to obtain any desired speed of movement of the motor, and including automatic means to prevent the selection of too high a value of pump displacement in any particular circumstances of operation that would cause overloading of the power source. A further object of the invention is to provide such a control which is efficient in operation and simple and inexpensive to install.

In a hydraulic transmission of the kind referred to connected between a mechanical power source and a load and having a selectable displacement control for the pump the present invention is characterised by the provision of a displacement control for the pump normally operable to select displacement of the pump to drive the motor at any desired speed, and overriding means for the displacement control operated by overload sensing means of the power source to reduce the pump displacement in an overriding manner to the extent to remove overload from power source. The power source may be an engine having an engine speed governor which controls motive fluid supply to the engine in order to tend to maintain the engine speed at a constant value, and the overriding means for the displacement control then preferably comprises means operative by the engine speed governor to reduce pump displacement with increase in the supply of motive fluid beyond a predetermined value. The overriding means for pump displacement may be a hydraulic servo motor controlled by the engine speed governor through a hydraulic valve either directly or electrically actuated. Control of displacement may be normally effected by means of a lever movable by a fixed fulcrum and a link pivotally connected to the lever and extending in a direction generally at right angles thereto for operation of the displacement control of the pump, overriding action of selected pump displacement as determined by the lever being obtained by providing a servo motor within the lever to move the pivot point from which the link extends to the displacement control to a position nearer to the fulcrum of the lever when overloading of the engine or other power source occurs. Alternatively, a link carrying control movement to the pump displacement control element may include a caged spring and a hydraulic piston and cylinder unit which is arranged to alter its length hydraulically when overload occurs, such alteration of length acting to reduce the selected pump displacement, and the caged spring acting to absorb the alteration in length so far as the movement control for the link is concerned. Two examples of the invention will now be described with reference to the accompanying drawings in which:

Figure 1 diagrammatically represents the first example.

Figure 2 diagrammatically represents the second example and

Figure 3 is the electrical circuit diagram applicable to Figure 2.

The example shown in Figure 1 is intended for use on a vehicle such as a tractor to transmit power from a diesel engine mounted on the vehicle to the ground engaging wheels. The diesel engine 1 of the vehicle is connected to drive a reversible variable positive displacement pump 2 forming part of the transmission, and from the pump a pair of pipe lines 3 and 4 extend to a positive displacement hydraulic motor 5 whose output shaft 6 is connected to drive the vehicle wheels. To maintain the transmission formed by pump 2, motor 5 and pipe lines 3 and 4 fully primed with liquid, a small make-up pump 7 is mounted on the engine which supplies pressure liquid to pipe 8 this pressure being maintained at a predetermined value by means of a pressurising valve 9. Pipe 8 feeds pressure liquid by means of a pair of non return valves 11 and 12 to the pipe lines 3 and 4, which ever of the pipe lines 3 or 4 is at the lower pressure receiving liquid from pipe 8 through the appropriate valve 11 or 12. The displacement of pump 2 is controlled by a displacement control element 13 movable vertically into and out of the pump 2. Movement of the element 13 is effected by means of a link 14 extending horizontally, its horizontal movement being converted to vertical movement by bell crank lever 15 and a small link 16 to move element 13.

Link 14 is moved by means of a manual control lever 17 pivotally mounted on the vehicle at a fixed fulcrum 18. The link 14 is pivotally connected to the lever 17 by a pivot 19 formed on the piston rod 21 of a hydraulic jack 22 carried by lever 17. The jack comprises a cylinder 23 closed at both ends and through one end of which the piston rod 21 extends in a sealed manner from the piston 24 whereby the underside of the piston 24 has a larger effective area than the upper side. The jack 22 is so arranged that the piston rod 21 moves longitudinally on the lever 17 whilst the link 14 extends in a direction at right angles to the zero displacement position of the lever 17 whereby movement of the piston rod 21 will vary the effective distance of the pivot 19 from the fulcrum 18 of the lever. The link 14 is made of considerable length relatively to the normal distance between 19 and fulcrum 18 so that movement of the pivot point 19 towards fulcrum 18 when lever 17 is in the zero displacement position will have substantially no adjusting effect on the element 13.

The engine 1 which is of the diesel variety is controlled to maintain a substantially constant speed, this control being effected by a governor which comprises a Venturi throat 25 formed in the inlet manifold 26 of the engine, a closed capsule mounted on the side of the engine including a flexible diaphram 28 urged outwardly by an enclosed spring 29, a pipe 31 interconnecting the throat of the Venturi with the capsule, and a fuel injection pump 32 having a fuel control bar 33 moved by diaphram 28 to adjust fuel delivered to the engine to tend to maintain a predetermined pressure below atmospheric at the throat of the Venturi 25. Since the engine is of the diesel variety it will be appreciated that there is no restriction in the air inlet manifold 26 leading to the engine and therefore that the air flow into the engine will be proportional to engine speed and that the pressure drop occuring at the throat of the Venturi will be in accordance with engine speed. The fuel injection pump 32 is of any of the known varieties which acts to adjust fuel delivered to the engine in accordance with movement of a bar 33 extending through the pump. If engine speed drops below the predetermined value, the bar 33 will be moved to the left by diaphram 28 as a result of increased pressure within the capsule 27 to increase fuel delivered to the engine and thus to raise the speed to the selected value. Alternatively, if the engine speed increases above the selected value an excessive pressure drop will occur at the Venturi throat which will act on the capsule 27 to move diaphram 28 and bar 33 to the right to reduce fuel delivered to the engine to maintain the selected speed.

Mounted on the side of the engine adjacent to the fuel injection pump 32 is a hydraulic control valve 34 comprising a cylinder 35 a spool valve member 36, and three ports 37, 38 and 39, arranged to be closed or opened by movement of the spool valve member 36. A spring 41 normally urges spool valve member to an outermost position where a spigot 42 extending from the spool valve member is adjacent to the end of the fuel bar 33 of the fuel injection pump. In the position as shown the fuel bar 33 is at a position representing minimum fuel flow to the engine and the space between this fuel bar 33 and the spigot 42 represents the normal movement of the fuel bar to adjust fuel flow into the engine from a minimum to a maximum. Beyond the maximum fuel flow position of the fuel bar to the left it is capable of a small amount of over travel without further increasing fuel flow to the engine. The fuel bar 33 is arranged to make contact with the spigot 42 at the position corresponding to maximum fuel injection to the engine and by its over travel to move the spool valve member 36 inwardly. Normally when the fuel bar does not contact the spigot 42 the port 38 is connected to port 37 within valve 34 but when the spool valve member 36 is moved by the fuel bar 33, port 37 is closed and port 39 is connected to port 38. The port 37 is connected by a pipe 43 to a hydraulic reservoir 44 which also serves to supply the make up pump 7 through a pipe 45. From the ports 38 and 39 in valve 34 a pair of pipes 46 and 47 extend to a control valve unit 48.

The valve unit 48 comprises a casing 49 within which a pair of cylindrical bores 51 and 52 are formed. Within the bore 51 a spool valve member 50 is slidably mounted and a link 53 extends to the control lever 17 being pivotally connected to the control lever and to spool valve member 52. Three ports 54, 55, and 56 open into the cylinder 51 and in the neutral position of lever 17 the ports 54 and 55 are closed by the spool valve member, the port 56 being open to the waisted space around the spool. The ports 54 and 55 are connected respectively by pipes 57 and 58 to the pipe lines 3 and 4 extending between pipe 2 and motor 5. Slight movement of the lever 17 in one direction or the other will connect either of the ports 54 and 55 to the port 56 so that when either forward or reverse movement is selected whichever of the pipe lines 3 or 4 is at higher pressure will be connected to the port 56. The port 56 extends through a passage 59 to the inner end of the cylinder 52 to act on the end of spool valve member 61 within cylinder 52. At the outer end of the cylinder 52 a strong spring 62 is located acting on the end of the valve member 61 to urge it against the force exerted by the pressure in passage 59. The loading in spring 62 is adjustable by means of a hand control wheel 63 which is screw threadedly mounted at the outer end of cylinder 52. The spool valve member 61 controls three ports 64, 65, and 66 opening into the wall of cylinder 52. Pipe 8 and pipe 47 join together into the port 66 and the pipe 46 enters the port 64. A pipe 67 extends from the port 65 for connection through a flexible pipe 68 to the lower end of the jack cylinder 22. A further flexible pipe 69 extending from pipe 8 is connected to the upper end of jack cylinder 23. The spool valve member 61 acts to connect together the ports 64 and 65 or ports 65 and 66 depending on its position as a result of movement against the spring 62.

In normal operation of the vehicle carrying the transmission as described the engine will normally run at a controlled speed depending on its governor formed by Venturi 25 and capsule 27. The make up pump 7 will supply liquid at a low pressure as determined by valve 9 into the transmission and also through flexible pipe 69 to the upper end of the jack cylinder 23, thus urging piston 24 to its lowermost position where pivot 19 is spaced at the maximum distance from the fulcrum 18. In the neutral position of the lever 17 where no displacement is selected from pump 2 the engine will run unloaded at its governed speed. Assuming that the lever is displaced to give forward movement of the vehicle the link 14 will be moved to the left to urge the displacement control element 13 downwardly to develop high pressure in the pipe line 4 which in turn will cause the motor 5 to rotate to drive the wheels to move vehicle forwardly. According to the load imposed on the engine 1 by the selected displacement of the pump the engine speed will reduce and the pressure will rise at the Venturi 25 to cause the fuel bar 33 to move to the left to increase fuel flow to the engine to tend to maintain the selected speed. Link 53 will be moved to the right to move spool valve 50 to open port 55 and allow liquid flow from pipe line 4 through ports 55, 56 and passage 59 to the end of cylinder 52 to urge the spool valve member 61 to the left against spring 62. If the pressure is not excessive, having regard to the setting of the hand wheel 63, the spool valve 61 will not move sufficiently to uncover port 66 and the lower end of the jack cylinder 23 will remain connected through pipes 68, 67, port 65, port 64, pipe 46, port 38 and port 37 to reservoir. If in moving the lever 17 forwardly an excessive displacement of transmission pump 2 is selected or alternatively if the vehicle comes to an upward incline the pressure developed in the pipe line 4 might be raised to an amount to cause the load on the engine to increase to the extent that the fuel bar 33 is moved by the governor to the left to just beyond the maximum fuel supply position, thus moving the spool valve member 36 inwardly against spring 41. Such movement will isolate the port 37 and connect port 38 to port 39 thus connecting make up pressure from pump 7 through pipes 8 and 47 to the pipe 46. This pressure will pass through ports 64, and 65 in cylinder 52 to the lower end of jack cylinder 23 through the pipes 67 and 68. Since the area of the underside of piston 24 is effectively larger than the area of the upper side, the piston 24 will be moved upwardly. In moving upwardly the pivot point 19 will come nearer to the fulcrum 18 of lever 17 and the link 14 will be moved to the right to reduce the original movement to the left given to lever 17. Thus, the displacement of the pump 2 will be reduced and the load applied to the engine 1 will be reduced to the extent that the fuel bar 33 is moved by the governor to the right to the normal maximum fuel flow position at which the spool valve 36 is almost restored to its normal position. The reduction in displacement of pump 2 will not necessarily reduce the pressure in pipe 4 but will adjust the speed ratio between the engine and the ground engaging wheels to allow the vehicle either to accelerate at the maximum rate dependent on the power of the engine or alternatively to ascend the incline at the maximum rate dependent on the power of the engine. The adjustment of the spool valve member 36 by the fuel injection pump is such as to maintain ports 37 and 39 partly open to determine at port 38 a pressure lower than the make up pressure delivered by pump 7 which will produce on the piston 24 a force balance to determine an equilibrium position of pivot point 19 closer to the fulcrum 18 than its normal position. If a reverse displacement of the pump 2 is selected by means of the lever 17 the spool valve member 50 will be moved to the left to connect pipe line 3 to the inner end of cylinder 52 and the link 14 will be moved to the right to give upward movement to the element 13 which in turn gives reverse displacement to the pump 2. If the selected displacement is such as not to overload the engine then the vehicle will move in accordance with the selected displacement. If overloading of the engine occurs then the valve 36 will be moved inwardly to cause the piston 24 to move upwardly to reduce the displacement movement given to link 14 and element 13 and to establish an equilibrium position as previously mentioned with respect to forward movement. When selecting either forward or reverse movement it will be noted that the spool valve member 50 is moved appropriately so that either of the pipe lines 3 or 4 which will be under pressure is connected to the inner end of cylinder 52 to urge spool valve member 61 against the loading of spring 62. The purpose of this arrangement is to provide the driver of the vehicle with a means for adjusting the maximum torque which may be exerted on the vehicle wheels to allow for the state of the ground over which the vehicle is travelling, for example on slippery ground he would arrange that the wheels could not exert a very great torque. This control is exerted through the hand wheel 63 which adjusts the loading of spring 62. For a low maximum torque on the wheels consistant with driving the vehicle on slippery ground the control wheel 63 would be unscrewed to reduce loading on the spring 62. As the required maximum torque is approached in the appropriate pipe line 3 or 4 the pressure is applied to spool valve 61 to move it against spring 62 and at the maximum pressure, the port 64 will be isolated and port 65 will be connected to port 66 thus connecting make up pressure from pump 7 to the lower end of jack cylinder 23 urging the piston 24 upwardly to reduce the selected displacement. In this instance the pressure in the pipe line 3 or 4 will not necessarily be reduced by this action until the piston 24 has moved upwardly to a very considerable extent where the pivot 19 comes close to the fulcrum 18.

In controlling the displacement of the pump to travel either forwardly or in reverse it is possible for the driver to move the lever to select full displacement in either direction without any harmful effect resulting since the control will act always to reduce the selected displacement so that power demanded from the engine is that given at maximum fuel supply. Also it will be seen that with reduction in selected displacement by operation of the governor the pressure in the pipe line 3 or 4 may actually increase and ultimately the control given by the spring 62 will come into effect to prevent any increase in pressure beyond the setting given by the hand wheel 63. When the vehicle is driven under normal conditions the vehicle speed is determined substantially by the movement given to the lever 17 to determine forward or reverse displacement of pump 2 without the engine governor having any effect on the transmission. In particular it will be seen that it is possible to move the vehicle slowly in either direction particularly for manoeuvering without any control being exerted on the transmission by the engine governor.

For installing this control on a vehicle having an existing hydrostatic transmission it will be seen that it is merely necessary to provide the valve units 34 and 48 and the jack unit 22, the existing engine governor serving to effect control of the transmission.

Reference is now made to the example disclosed by Figures 2 and 3. This example again is for use on a vehicle to transmit power from the engine to the ground engaging wheels and where possible similar reference numerals will be used for similar items appearing in the previous example. As in the previous example a diesel engine 1 drives a reversible variable positive displacement transmission pump 2 which is connected by pipe lines 3 and 4 to a positive displacement transmission motor 5 which in turn has a driving shaft 6 connected to rotate the ground engaging wheels of the vehicle. Also a make up pump 7 taking liquid from a reservoir 44 delivers liquid at a pressure determined by valve 9 to a pipe 8. Non return valves 11 and 12 are provided in order to prime whichever of the pipe lines 3 or 4 is at lower pressure, with low pressure from pump 7. The diesel engine is provided with a governor comprising the Venturi 25 in the manifold 26, and capsule 27 having a spring loaded diaphragm 28 for controlling the fuel bar 33 of the fuel injection pump 32. Control of the transmission in this example is effected by a combined electrical and hydraulic control. In place of the valve 34 a switch S4 is provided adjacent to the fuel pump 32 for operation by the fuel bar on over travel from the maximum fuel supply position. The control lever 17 is mounted at a fixed fulcrum 18 and moves a rod 71 to the left or to the right for forward or reverse displacement selection. On the rod 71 a piston 72 is mounted which is slidable within a cylinder 73. The cylinder 73 is closed at both ends and the rod 71 extends in a sealed manner through both ends so that equal areas are available on the two sides of the piston 72 on which liquid pressure may act. From the cylinder 73 a connection 74 extends to the bell crank lever 15 which causes vertical movement of the displacement control element 13 of pump 2. Within the cylinder 73 a pair of springs 75 and 76 are provided which are preloaded and normally will hold the piston 72 centrally between the ends of cylinder 73. These springs are thus caged within the cylinder 73. A pair of flexible pipes 77 and 78 extend one from each end of the cylinder 73 to a connecting block 79. Within this block 79 the flexible pipes are connected to low pressure from pipe 8 through a pair of restrictors 81 and 82. Also extending from the block 79 are a pair of pipes 83 and 84 which are in direct connection respectively with pipes 77 and 78. These pipes extend to a pair of electro hydraulic valves 85 and 86. Each of these valves includes an energising solenoid 87 and 88 respectively (Figure 3) and in each case when the solenoid is energised the valve is opened to allow liquid to flow from the appropriate pipe 83 or 84 to reservoir 44. The lower end of the lever 17 is provided with a cam 89 for co-operation with a two way switch S3. The main surface of the cam 89 is circular, the centre of curvature being the fulcrum 18. In the neutral position of the lever 17 the switch S3 is operated to a central position where it makes no contact. Movement of the lever 17 to reverse will cause the cam 89 to fully depress the switch S3 to make contact S32. Movement of the lever 17 to the forward position will move the cam away from the switch S3 so that it will make the contact S31. To determine the maximum safe pressure that may be permitted to exist within the pipe lines 3 and 4, a pair of Bourdon tubes 89 and 91 in connection with pipes 3 and 4 by pipes 92 and 93 act on switches S1, S2 and take control in a manner to be described.

In normal operation when the engine is running the make up pump 7 will deliver liquid at low pressure determined by valve 9 which will prime the transmission through the pipe lines 3 and 4 and which will act through the flexible pipes 77 and 78 on both sides of the piston 72, developing equal and opposite forces which thus do not move the cylinder 73 relatively to the piston 72. Assuming a forward displacement is selected, the rod 71 is moved to the left, the cam 89 leaves the switch S3 so that circuit is made to contact S31 and the movement imparted to the rod 71 is transferred through springs 75 and 76 to the cylinder 73 to move bell crank 15 and 16 and displacement control element 13 to give the pump the required displacement. Pressure is developed in pipe line 4 to cause movement of the motor 5. If the lever is moved too far to select an excessive acceleration or, alternatively, the vehicle comes to an upward incline, the pressure in pipe line 4 will increase thus increasing the load on the engine and the governor will act on fuel bar 33 to move it to the left to increase fuel flow to the engine. In the event that the fuel bar 33 is moved to just beyond the maximum fuel position the switch S4 will be operated to close its contacts and to complete a circuit to contact S31 to solenoid 87 thus to open the electro hydraulic valve 85 and to connect the left hand end of cylinder 73 to reservoir. The function of the restrictor 81 is to prevent excessive flow of liquid from pipe 8 through the valve 85 to reservoir. The action of pressure at the right hand end of cylinder 73 will then move the cylinder 73 to the right to reduce the controlling movement given to the element 13 by the rod 71 and thus to reduce the selected displacement. Displacement will be reduced until the fuel bar 33 moves to the maximum fuel position and opens the switch S4. Whilst the excessive load continues the fuel bar will oscillate about the maximum fuel position to cause continuous opening and closing of valve 85 so that the mean reduction of selected displacement given to the element 13 is sufficient to maintain the engine fully loaded. When reverse displacement is selected the switch S3 is operated by cam 89 to close contact S32. Overloading of the engine causes governor operation of switch S4 to complete its circuit through contact S32 and solenoid 88 to open electro hydraulic valve 86 and thus to reduce the selected movement of rod 71. In the event that an excessively high pressure appears in either of the pipe lines 3 or 4 movement of the appropriate Bourdon tube 89 or 91 will operate one of the switches S1 or S2 to open the appropriate electro hydraulic valve 85 or 86 to reduce the selected displacement by movement of cylinder 73.

In this example the extra control apparatus over and above the engine and transmission comprise basically piston and cylinder 72 and 73, electro hydraulic valves 85 and 86, and switches S3 and S4 which are quite simple and which at the same time act effectively.

Whilst the described examples show diesel engines as the power source it will be appreciated that the invention is equally applicable to other types of power source such for example gasoline engines, electric motors, and the like. In the case of a gasoline engine the means to sense overload may be a rotational speed governor driven by the engine and acting to control engine speed by controlling fuel flow or alternatively it might be the setting of the throttle control on the engine manifold or a means sensitive to manifold pressure. In the case of an electric motor, means sensitive to overloading of the motor may merely comprise an electrical meter to measure current flowing to the motor and arranged to take overriding action when the current exceeds a predetermined amount above which it would be dangerous to run the motor. Again, where the electric motor is run from an alternating current supply, a simple speed governor indicating reduction of motor speed from a valve corresponding to the frequency of the alternating supply may act to take the overriding action.

We claim as our invention:

1. For use with a hydraulic transmission comprising a variable positive displacement transmission pump hydraulically connected to a positive displacement hydraulic transmission motor, a power source driving the pump and a load driven by the motor, a control system comprising a displacement control for the pump normally operable to select pump displacement to drive the motor at any desired speed, overriding means for the displacement control so arranged as to be capable only of reducing selected displacement, and overload sensing means for the power source operative on occurrence of an overload to reduce pump displacement in an overriding manner to the extent necessary to remove the overload from the power source.

2. A control system as claimed in claim 1 for use where the power source comprises an engine having a speed governor to control motor fluid to the engine in order to tend to maintain the engine speed at a constant value wherein the overriding means is arranged for operation by the engine governor to reduce pump displacement when the governor causes motor fluid to flow to the engine to increase beyond a predetermined value.

3. A control system as claimed in claim 2 wherein the displacement control for the pump comprises a lever angularly movable about a fixed fulcrum to select displacement, a link longitudinally movable for displacement adjustment and extending in a direction at right angles to the lever direction corresponding to zero pump, displacement, and a pivotal connection between the link and the lever, and the overriding means comprises a cylinder carried by the lever with axis directed longitudinally of the lever, and a piston in the cylinder connected to move the said pivotal connection nearer to the lever fulcrum on increase in motive fluid to the engine beyond the predetermined value.

4. A control system as claimed in claim 3 wherein the piston has different effective hydraulic areas constituting a large area and a small area, respectively, and including a hydraulic servo pressure source connected to supply pressure liquid constantly to the smaller piston area to urge the pivotal connection away from the fulcrum, a reservoir, and a valve controllable by the engine governor to connect the larger area piston normally to the reservoir and on increase in motive fluid beyond the predetermined value to connect the larger area of the piston to the servo pressure source to urge the pivotal connection towards the fulcrum of the lever whereby to reduce the displacement controlling movement of the link.

5. A control system as claimed in claim 4 wherein the servo pressure source comprises an engine driven make up pump which also serves to maintain the transmission primed with hydraulic liquid.

6. A control system as claimed in claim 4 including pressure sensitive means connected to the hydraulic pressure output of the transmission pump, and a hydraulic valve operative by the said pressure sensitive means when transmission pump output pressure exceeds a predetermined value to connect the larger area of the piston to the servo pressure source to urge pivotal connection of the link towards the lever fulcrum whereby to reduce displacement controlling movement of the link.

7. A control system as claimed in claim 6 for use with a transmission pump of reversible variable positive displacement including a selector valve operated by initial movement of the lever in either direction from the zero displacement position to select the output pressure from the transmission pump and connect it to the pressure sensitive means.

8. A control system as claimed in claim 4 for use with a diesel engine in which fuel is the motive fluid and the engine speed governor acts on a diesel fuel injection pump wherein the said valve is operable by the controlling movement imparted to the fuel pump by the governor.

9. A control system as claimed in claim 2 in which the overriding means comprises a hydraulic servo motor and includes an electric switch operable by the governor on increase in the motive fluid flow to the engine beyond the predetermined value, and an electro hydraulic valve connected to operate the servo motor to reduce selected transmission pump displacement on operation of the switch by the governor.

10. A control system as claimed in claim 9 wherein the displacement control comprises a manually operable element, and a caged spring movable by the element to effect displacement variation of the transmission pump, the hydraulic servo motor being connected to alter the length of the caged spring to cancel wholly or in part the transmission pump displacement selected by the manually operable element.

11. A control system as claimed in claim 10 wherein the servo motor comprises a piston and cylinder unit, and the caged spring is located within the cylinder to act between the piston and cylinder of the unit.

12. A control system as claimed in claim 11 wherein the piston and cylinder unit comprises a cylinder closed at both ends, a piston within the cylinder, a piston rod extending from the piston in a sealed manner through both ends of the cylinder to provide equal effective hydraulic areas on either side of the piston, and the caged spring comprises a pair of compression springs enclosed within the cylinder one on either side of the piston, the electro hydraulic valve acting on operation by the governor control switch to create a differential hydraulic pressure on opposite sides of the piston to move the piston relatively to the cylinder, and to reduce the selected displacement controlling movement given by the manually operable element.

13. A control system as claimed in claim 12 including a hydraulic servo pressure source, a connection from the source to each end of the cylinder of the piston and cylinder unit and a restrictor in one connection to the cylinder, the electro hydraulic valve acting to connect the cylinder end of the said restrictor to reservoir on operation by the engine governor to cause a pressure differential to be created across the piston to reduce the displacement movement applied by the manually operable element.

14. A control system as claimed in claim 13 in which the transmission pump is of reversible variable displacement and including a restrictor in the servo pressure connection to each end of the cylinder of the piston and cylinder unit, a pair of electro hydraulic valves connected one to each end of the cylinder and alternatively operable to connect one or other end of the cylinder to reservoir, a cam mounted on the manually operable element, a double acting switch operable by the cam in accordance with the direction of displacement selecting movement imparted to the manually operable element, and electrical circuit means interconnecting the double acting switch with the two electro hydraulic valves such that movement of the manually operable element to select a particular direction of displacement prepares an electrical circuit to one electro hydraulic valve and movement in the other direction prepares another electrical circuit to the other electro hydraulic valve, the switch operable by the engine governor acting on increase of motive fluid beyond the predetermined value to complete the prepared circuit to operate one electro hydraulic valve to connect one end of the servo cylinder to reservoir such that the piston will move relatively to the cylinder to reduce the selected displacement.

References Cited in the file of this patent
UNITED STATES PATENTS

| | | |
|---|---|---|
| 1,259,090 | Ferris et al. | Mar. 12, 1918 |
| 2,326,821 | Boyle | Aug. 17, 1943 |
| 2,505,727 | Vickers | Apr. 25, 1950 |
| 2,741,989 | Postel et al. | Apr. 17, 1956 |